Figure 3:
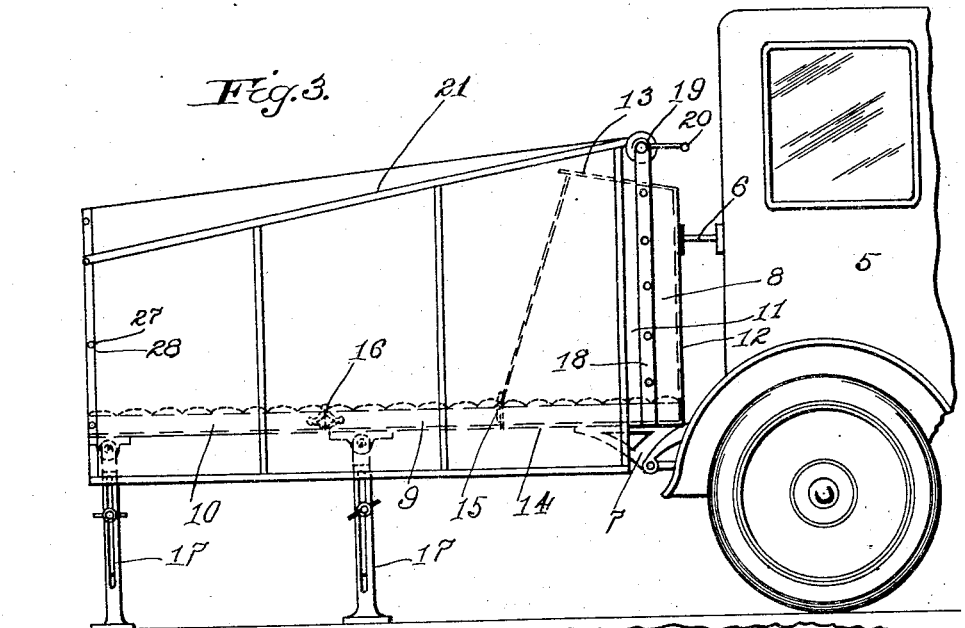

June 15, 1926. 1,588,463
F. B. MILLER ET AL
FOLDING BED FOR MOTOR VEHICLES
Filed Sept. 13, 1923  2 Sheets-Sheet 1
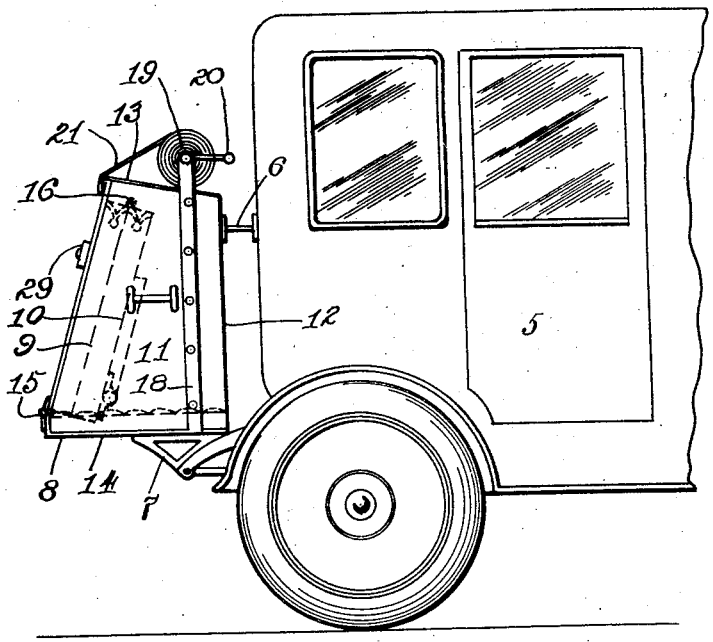

June 15, 1926.

F. B. MILLER ET AL 1,588,463

FOLDING BED FOR MOTOR VEHICLES

Filed Sept. 13, 1923    2 Sheets—Sheet 2

Inventor
F. B. Miller,
H. S. Miller.

By J. F. Dawling
Attorney

Patented June 15, 1926.

1,588,463

UNITED STATES PATENT OFFICE.

FRANK B. MILLER, OF KANSAS CITY, MISSOURI, AND HIRAM S. MILLER, OF BALTIMORE, MARYLAND.

FOLDING BED FOR MOTOR VEHICLES.

Application filed September 13, 1923. Serial No. 662,395.

This invention relates to certain new and useful improvements in folding beds for automobiles and has for its particular object the provision of a bed capable of being attached to a carrier in a compact manner and one which can be easily opened to active position and refolded when not in use.

A still further object of this invention is to provide a folding bed capable of being attached to the rear of a vehicle and equipped with an awning or tent structure which will completely encase the bed when in extended position.

A still further object of the invention is the provision of a case attached to a motor vehicle having formed therein hinged sections constituting a bed and a covering means arranged to encase the bed when in extended position from the case.

A still further object of the invention is the provision of a sectional folding bed and a case to receive and enclose said sections when not in use.

Another object of the invention is the provision of a folding bed for motor vehicles including a case capable of receiving the folding sections and bed clothing when in closed position and a covering or awning carried by the case to be extended over the bed when the latter is in extended position out of the case.

A still further object of the invention is the provision of a folding bed including hinged sections having adjustable legs and tent or awning supporting means, said sections foldable on one another and hinged to the case so as to be folded within the casing when not in use, and the awning or tent structure carried by the case to enclose said sections of the bed when in extended position.

A still further object of the invention is the provision of a case having hinged thereto foldable bed sections, an awning or tent structure carried by the case and a means to wind and unwind said tent or awning as desired.

With these and other objects in view, the invention consists in certain novel features, combination and arrangement of parts as will be hereinafter more fully described, shown in the accompanying drawings, and claimed.

Figures 4, 5:
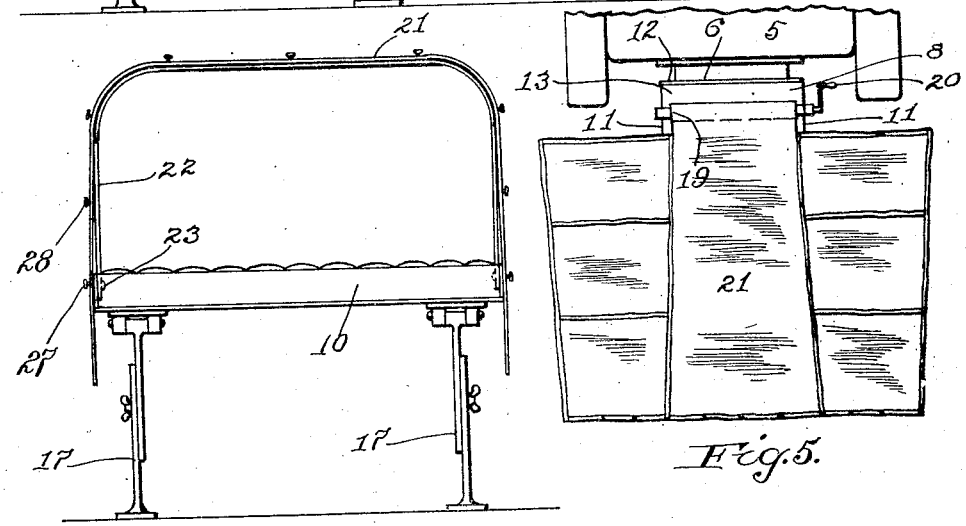

In the drawings,

Figure 1 is a side elevation of our improved bed showing the sections in dotted lines and the case attached to a motor vehicle, Figure 2 is a side elevational view illustrating the sections of the bed in extended position and their relation to the case, Figure 3 is a side elevational view illustrating the bed in extended, active position, enclosed by the awning or tent, Figure 4 is an end elevational view of the bed in extended position with the awning or tent enclosing the same, and Figure 5 is a top plan view of the tent or awning showing the side portions thereof extended with relation to the top thereof.

Like numerals of reference designate corresponding parts throughout the several views of the drawings.

Numeral 5 indicates a motor vehicle to the rear end of which is secured by suitable brackets 6 and a supporting member 7 a case 8 in which case are foldable sections 9 and 10 of our improved sectional bed, which constitutes this invention.

The case 8 is provided with side walls 11, a rear wall 12, a top wall 13, and a bottom wall 14, the bottom wall constituting one of the sections of the bed previously described.

The section 9 is hingably secured as at 15 to the forward edge of the bottom wall 14, and to the forward edge of the section 9 is hinged the section 10 as at 16. The section 10 is foldable upon the section 9, and the sections 9 and 10 are then foldable by virtue of the hinge 15 into the casing 8 as clearly shown in Figure 1. The folding of these sections leaves sufficient room in the case between the rear wall 12 and section 10 for bed clothing such as pillows, mattress, sheets and the like.

The sections 9 and 10 are provided with adjustable supporting legs 17, which are foldable against the underside of their respective sections and these legs constitute supporting means for these sections when in extended position as shown in Figures 2 and 3.

Secured to the opposite side walls 11 of the case 8 are perpendicular braces 18, the upper ends of which extend beyond the top wall 13 and have journaled therein a roller 19, which roller is provided with a suitable handle 20, this handle providing the means for winding or unwinding a tent or awning 21 mounted on the roller 19. The tent or awning 21 is of sufficient length to extend beyond the front edge of the foldable section 10 of the bed structure and is supported over the section by a frame work 22 hingably supported as at 23 to the forward end of the section 10.

The frame work 22 is held in raised or perpendicular position by virtue of a brace 24, which has one end secured as at 25 to the frame 22 and its opposite end adjustably secured as at 26 to the section 10.

The frame structure 22 is provided with suitable fastening means 27 which cooperate with fastening means 28 carried by the awning or tent 21 so that the latter may be securely fastened to the frame and held in position as shown in Figures 3 and 4.

The sections 9 and 10 are held against accidental displacement from the casing 8 by means of a suitable catch 29 secured to the casing as shown in Figures 1 and 2.

In Figure 5 we have shown a top plan view of the roller and awning attached thereto. The awning in this view is extended or has its side pieces extended and these side pieces when in use enclose the sides of the sections 9 and 10 so as to provide an enclosure for the sections when the device is in active, working position.

When the section 10 is folded over against the section 9 and the section 9 is folded together with the section 10 into the case 8, the case assumes the appearance of a baggage or trunk carrier, and it affords a means for sleeping quarters which is compact and simple and one which may be easily and quickly assembled and placed in position for immediate occupancy.

In use, it is only necessary to pull the sections 9 and 10 from the case 8, fold the legs in perpendicular position and adjust them to suit the user. The frame work 22 is then raised to the position shown in Figures 2 and 4, the awning is unwound from the roller 19 and fastened to the frame, and the device is ready for use. To disassemble or repack the bed, it is only necessary to first rewind the awning on the roller 19 after unfastening it from the frame 22, release the brace 24 and fold the support 22 against the upperside of the section 10, fold the section 10 against the upperside of the section 9, at the same time folding the legs of the section 10 against the underside thereof, fold the sections 9 and 10 into the case 8 and at the same time folding the legs 17 of this section against the underside thereof. The bed clothing and other equipment is packed in the case between the sections and the rear wall thereof.

Having thus described our invention, what we claim as new is:

A folding bed for motor vehicles, comprising a casing adapted to be secured to a vehicle, hinged sections connected to the bottom wall of said casing, foldable one upon the other into said casing, a plurality of relatively spaced adjustable supporting legs hinged to the underside of each section and foldable therewith, a cover support pivoted to the extreme outer hinged section and foldable upon said section when not in use, braces pivoted to said supports and adapted to hold said supports in upright position relative to said sections, a reel and cover carried by said casing, means for winding said cover on said reel, means to permit said cover to be secured to said supports of said outermost section so as to enclose the entire construction when extended, and a locking means for said sections when the latter is folded into said casing.

In testimony whereof they hereunto affix their signatures.

FRANK B. MILLER.
HIRAM S. MILLER.